US012252240B2

(12) United States Patent
Breon et al.

(10) Patent No.: US 12,252,240 B2
(45) Date of Patent: Mar. 18, 2025

(54) COMMONLY MANUFACTURED ROTOR BLADE

(71) Applicant: Lockheed Martin Corporation, Bethesda, MD (US)

(72) Inventors: Joshua A. Breon, Lafayette, IN (US); Eric S. Parsons, Middlebury, CT (US); Timothy James Conti, Shelton, CT (US); Frank M. Caputo, Cheshire, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 18/409,652

(22) Filed: Jan. 10, 2024

(65) Prior Publication Data
US 2024/0140600 A1 May 2, 2024

Related U.S. Application Data

(62) Division of application No. 17/881,497, filed on Aug. 4, 2022, now Pat. No. 11,919,627.

(51) Int. Cl.
*B64C 27/48* (2006.01)
(52) U.S. Cl.
CPC .................. *B64C 27/48* (2013.01)
(58) Field of Classification Search
CPC ..... B64C 27/48; B64C 27/023; B64C 27/473; B64C 27/32; B64C 27/467; B64C 27/33; B64C 2027/4736
See application file for complete search history.

(56) References Cited

U.S. PATENT DOCUMENTS

| 2,606,728 A | 8/1952 | Sikorsky |
| 5,263,821 A | 11/1993 | Noehren et al. |

(Continued)

FOREIGN PATENT DOCUMENTS

| CA | 700992 A | 12/1964 |
| GB | 0 623 322 A | 5/1949 |

(Continued)

OTHER PUBLICATIONS

Extended European Search Report on European Patent Application No. 23188865.2 dated Dec. 5, 2023 (9 pages).

(Continued)

*Primary Examiner* — Dapinder Singh
(74) *Attorney, Agent, or Firm* — Foley & Lardner LLP

(57) ABSTRACT

A rotor blade configured to be installed on a rotary wing aircraft includes a spar including an inboard portion extending from a root of the rotor blade to a first spanwise position of the rotor blade and an outboard portion meeting the inboard portion at the first spanwise position. The rotor blade further includes an upper skin and a lower skin coupled the outboard portion of the spar. The first spanwise position is defined by a most inboard point at which the upper and lower skins are coupled to the spar. The inboard portion includes a top layer, a bottom layer, and an inner cavity. The top layer has a substantially constant first thickness and the bottom layer has a substantially constant second thickness, and the distance between an outer surface of the top layer and an outer surface of the bottom layer is substantially constant.

11 Claims, 7 Drawing Sheets

(56) References Cited

U.S. PATENT DOCUMENTS

| | | | | |
|---|---|---|---|---|
| 5,417,549 | A * | 5/1995 | Purse | B64C 27/473 |
| | | | | 416/248 |
| 9,771,152 | B2 * | 9/2017 | Thomas | B64C 27/48 |
| 10,227,132 | B2 * | 3/2019 | Sutton | B64C 27/473 |
| 10,793,264 | B2 * | 10/2020 | Nussenblatt | B64C 27/48 |
| 11,014,661 | B2 | 5/2021 | Scott et al. | |
| 11,365,000 | B2 | 6/2022 | Hayashida et al. | |
| 2012/0087797 | A1 * | 4/2012 | Kuntze-Fechner | B64C 27/473 |
| | | | | 416/220 A |
| 2013/0064674 | A1 * | 3/2013 | Hunter | B64C 27/32 |
| | | | | 416/226 |
| 2017/0283035 | A1 | 10/2017 | Ji et al. | |
| 2020/0398968 | A1 | 12/2020 | Sjostedt et al. | |

FOREIGN PATENT DOCUMENTS

| | | |
|---|---|---|
| GB | 0 831 508 A | 3/1960 |
| KR | 20120037195 A | 4/2012 |

OTHER PUBLICATIONS

Notice of Allowance on U.S. Appl. No. 17/881,497 dated Oct. 3, 2023 (9 pages).

\* cited by examiner

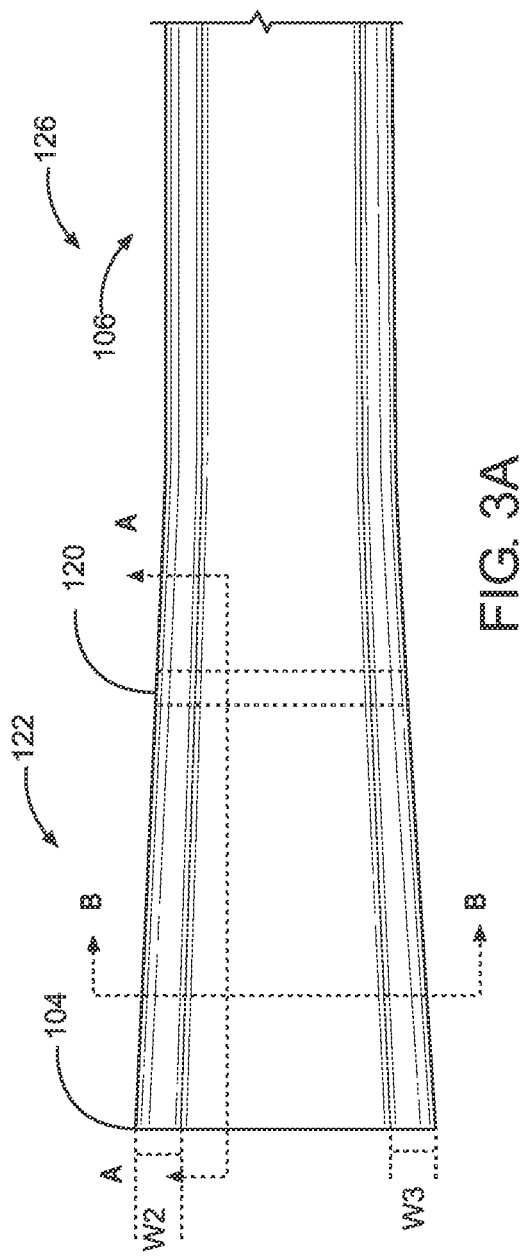
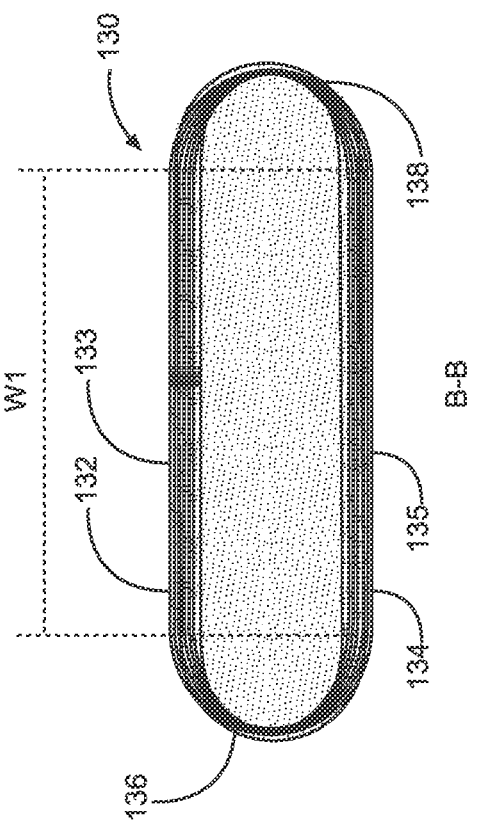
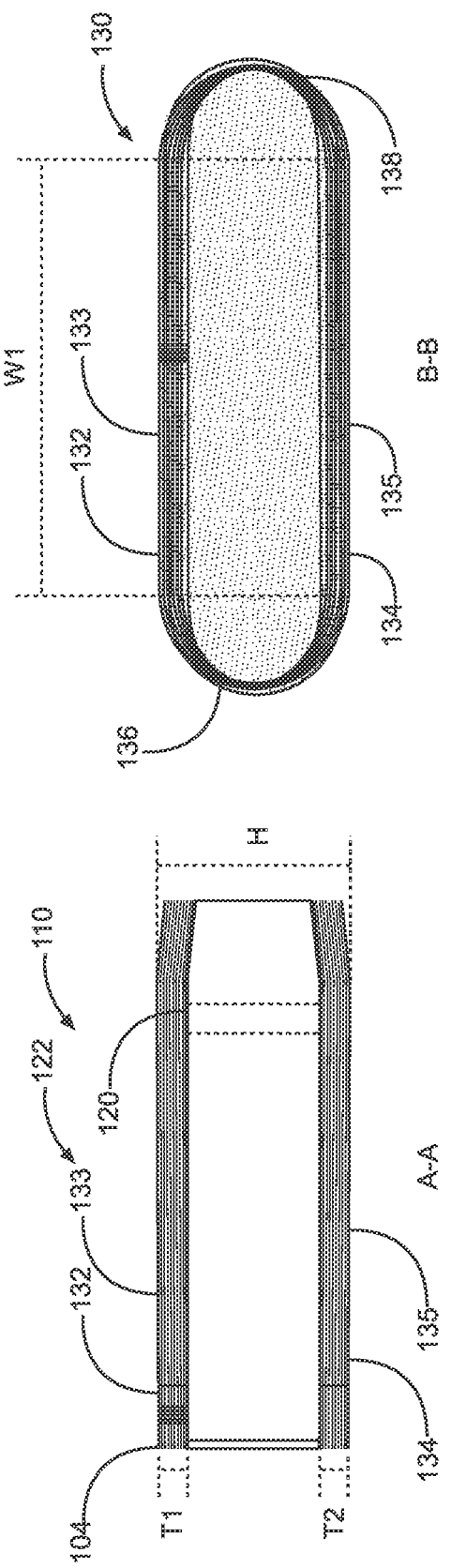
FIG. 3A
FIG. 3B
FIG. 3C

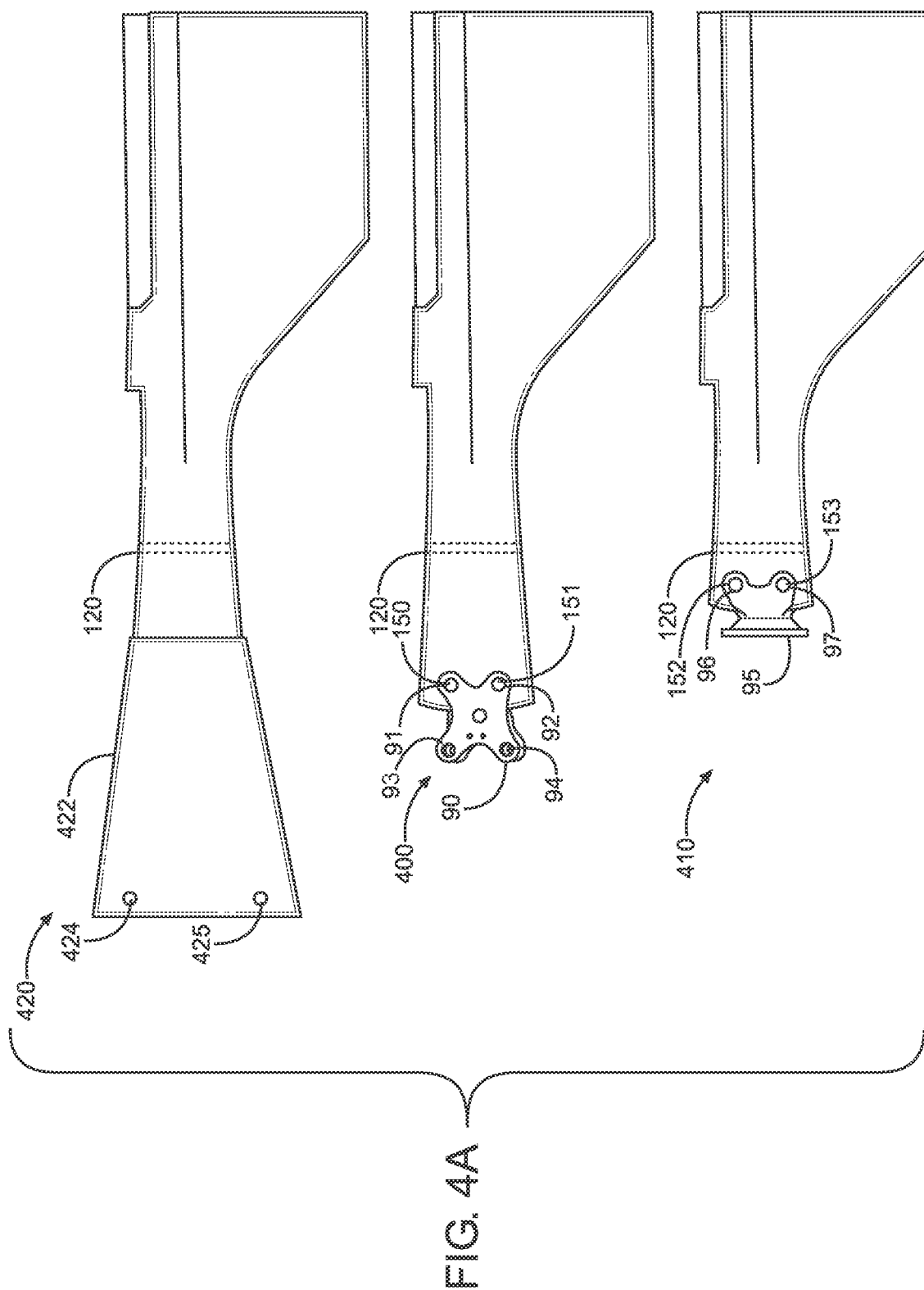

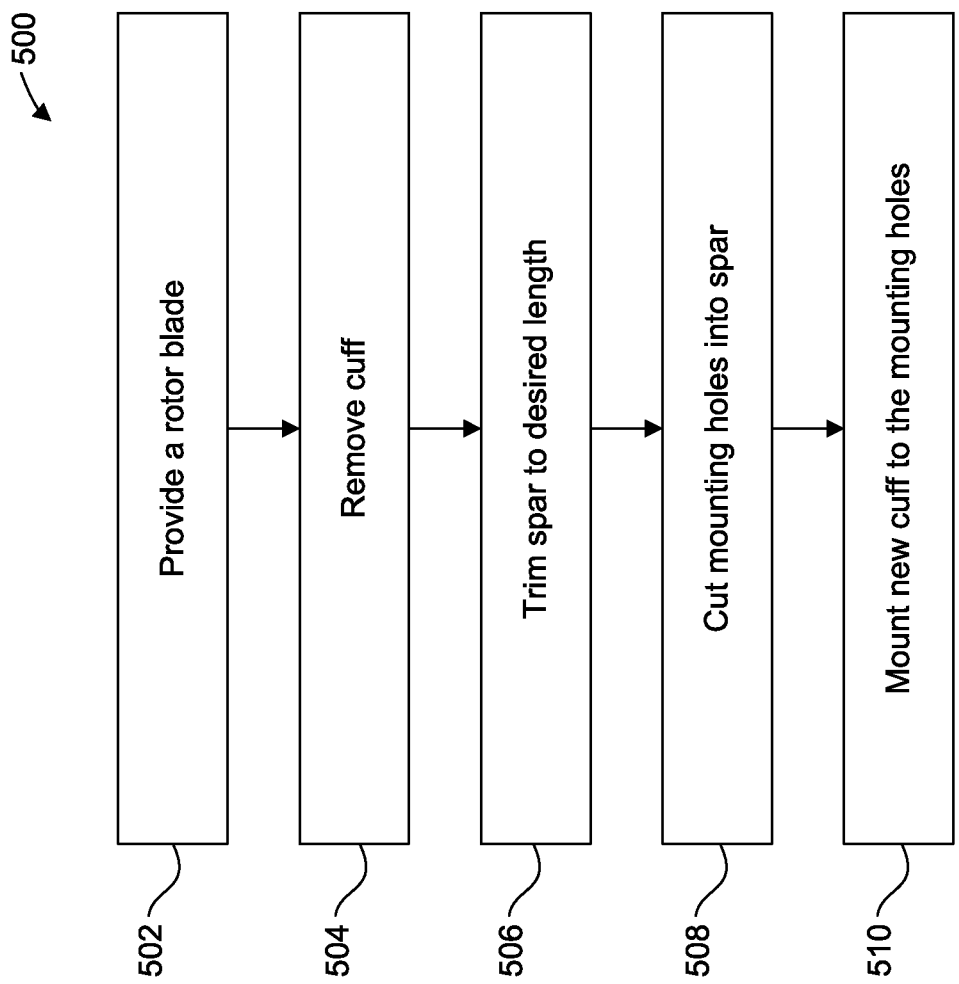

COMMONLY MANUFACTURED ROTOR BLADE

CROSS-REFERENCE TO RELATED APPLICATIONS

This application is a divisional of U.S. patent application Ser. No. 17/881,497, filed on Aug. 4, 2022, the content of which is incorporated herein by reference in its entirety.

BACKGROUND

Rotary wing aircraft, such as helicopters, require different rotor blades depending on the model of the aircraft. Manufacturing the different rotor blades requires expensive custom tooling and machinery.

SUMMARY OF THE INVENTION

The present disclosure describes a rotor blade configured to be modified for use in a variety of rotary wing aircraft and methods of modifying the rotor blade.

In an exemplary aspect, a method of modifying a rotor blade is provided. The rotor blade includes a spar having an inboard portion with a substantially constant overall height, the inboard portion further including a top layer having a substantially constant first thickness and a bottom layer having a substantially constant second thickness. The method includes adjusting a root portion of the inboard portion to thereby alter a length of the rotor blade from a first length to a second length and installing a cuff configured to couple to the rotor blade to an aircraft.

In another exemplary aspect, a rotor blade configured to be installed on a rotary wing aircraft incudes an inboard portion extending from a root of the rotor blade to a first spanwise position of the rotor blade, an outboard portion meeting the inboard portion at the first spanwise position, and an upper skin and a lower skin coupled the outboard portion of the spar. The first spanwise position is defined by a most inboard point at which the upper and lower skins are coupled to the spar. The inboard portion comprises a top layer, a bottom layer, and an inner cavity, wherein the top layer has a substantially constant first thickness and the bottom layer has a substantially constant second thickness, and wherein the distance between an outer surface of the top layer and an outer surface of the bottom layer is substantially constant.

In yet another exemplary aspect, a rotor blade configured to be installed on a rotary wing aircraft is provided. The rotor blade includes a spar including an inboard portion extending from a root of the rotor blade to a first spanwise position of the rotor blade, an outboard portion meeting the inboard portion at the first spanwise position, and an upper skin and a lower skin coupled to the outboard portion of the spar. The first spanwise position is defined by a most inboard point at which the upper and lower skins are coupled to the spar. The inboard portion comprises a top layer, a bottom layer, and an inner cavity, wherein the top layer has a substantially constant first thickness and the bottom layer has a substantially constant second thickness, and wherein the distance between an outer surface of the top layer and an outer surface of the bottom layer is substantially constant.

BRIEF DESCRIPTION OF THE DRAWINGS

FIG. 3A is a plan view of a portion of the spar of a rotor blade, according to some embodiments.

FIG. 3B is a section view of the spar of FIG. 3A.

FIG. 3C is a section view of the spar of FIG. 3A.

FIG. 4A is a plan view of three configurations of a rotor blade, according to some embodiments.

FIG. 5 is a flowchart illustrating a process of modifying a rotor blade, according to some embodiments.

It will be recognized that the Figures are the schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, commonly manufactured rotor blades and method of modifying the blades for use in different models of aircraft. The various concepts introduced above and discussed in greater detail below may be implemented in any of a number of ways, as the described concepts are not limited to any particular manner of implementation. Examples of specific implementations and applications are provided primarily for illustrative purposes.

Various models of rotary wing aircraft require similar, but distinct rotor blade designs. Custom manufacturing of each design occupies valuable factory floor space and requires custom tooling and machinery. Accordingly, it would be advantageous to provide single a rotor blade that can be easily adapted for use in multiple models of aircraft.

The exemplary non-limiting embodiments described herein provide a rotor blade with a spar having an inboard end that has a substantially constant overall height, as well as a top and a bottom layer each having a substantially constant thickness. The inboard end of the spar can be trimmed for use in aircraft requiring a shorter overall spanwise blade length, or a blade extender can be coupled to the root end of the spar for use in an aircraft requiring a longer overall spanwise blade length. The blade root seal is positioned outboard of the outboardmost trim position, so that the root seal is not removed during the trimming process.

Figure 1:
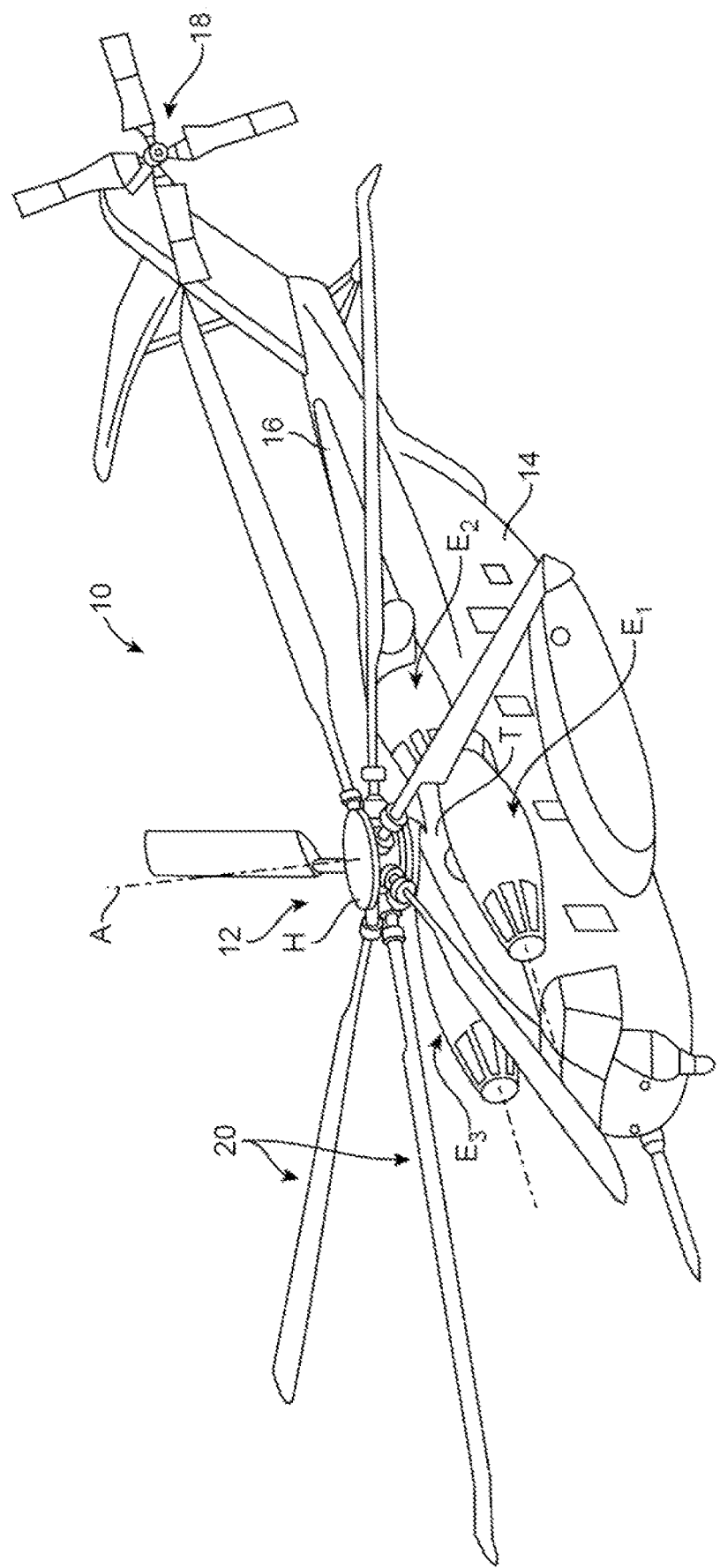
FIG. 1 is a perspective view of a rotary wing aircraft.

Referring to FIG. 1, an example of a vertical takeoff and landing (VTOL) rotary-wing aircraft 10 having a main rotor system 12, such as a helicopter, is illustrated. As shown, the aircraft 10 includes an airframe 14 having an extending tail 16, which mounts a tail rotor system 18, such as an anti-torque system. The main rotor system 12 is driven about an axis of rotation A via a main gearbox, illustrated schematically at T, by one or more engines, illustrated at E1-E3. The main rotor system 12 includes a plurality of rotor blades 20 mounted to a rotor hub assembly H. The rotor blades 20 may be rotor blades in accordance with the embodiments described herein. Although a particular helicopter configuration is illustrated and described herein, other configurations and/or aircraft may be utilized in connection with the concepts described herein. For example, the techniques according to the present disclosure may be implemented in a variety of aircraft, including a high speed compound rotary wing aircraft with supplemental translational thrust systems, a dual contra-rotating rotary aircraft, coaxial rotor system aircraft, a tilt-rotor aircraft, and a tilt-wing aircraft.

Figure 2:
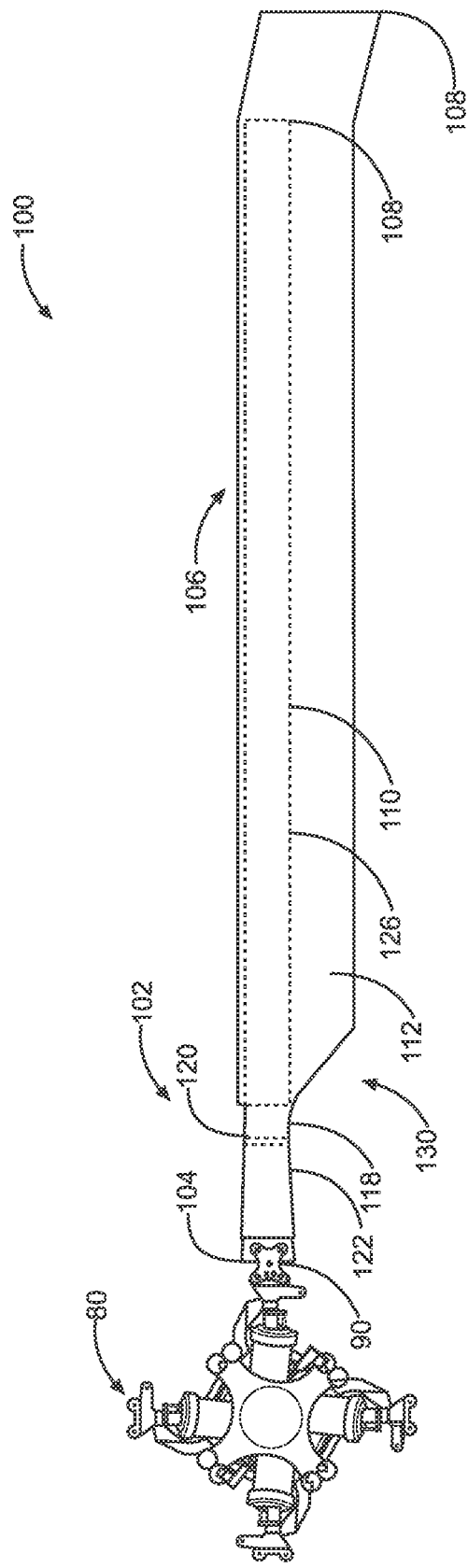
FIG. 2 is a perspective view of a rotor blade coupled to a rotor hub, according to some embodiments.

Referring to FIG. 2 a rotor blade 100 is shown, in accordance with an exemplary embodiment. The rotor blade 100 includes an inboard portion 102, including a blade root 104 defining the inboardmost end of the rotor blade 100, and an outboard portion 106, including a blade tip 108 defining the outboardmost end of the rotor blade 100. A cuff 90 couples the rotor blade 100 to the rotor hub 80. A spar 110 extends from the blade root 104 to an outboard end 116 in the outboard portion 106 of the rotor blade 100. The spar 110 has an inboard portion 122 and an outboard portion 126. The spar 110 is the primary structural member of the rotor blade 100. An upper blade skin 112 and a lower blade skin (on reverse side, not shown), as well as a leading edge sheath 115, are coupled to the spar 110 and define the aerodynamic surfaces of the airfoil. The upper blade skin 112 and the lower blade skin extend from an inboard end 118 of the upper blade skin 112 and the lower blade skin toward the blade tip 108. The inboard portion 122 of the spar 110 may be substantially the same as the inboard portion 102 of the rotor blade 100, while the outboard portion 106 of the rotor blade 100 includes both the outboard portion 126 of the spar 110 and the upper blade skin 112 and the lower blade skin. The inboard end 118 of the upper blade skin 112 and the lower blade skin may define a first spanwise position of the spar 110, at which the inboard portion 102 meets the outboard portion 106 of the spar 110.

The upper blade skin 112 and the lower blade skin may include a cutout 130, rather than extending perpendicularly in the aft direction from the spar 110 (e.g., downward, as shown in FIG. 2). This cutout 130 may be required for certain models of aircraft, for example, aircraft models that are configured to fold the rotor blades rearward toward the tail 14 of the aircraft 10 or forward toward the nose in order to park the aircraft in a tight space. More specifically, the rotor blade 100 may be coupled to a rotor hub that includes a hinge, and the rotor blade 100 may be rotated rearward or forward about the hinge. When the rotor blades are folded back or forward, the cutout 130 is required to prevent the rotor blade 100 from contacting other components of the aircraft. Though the cutout 130 may not be required for every aircraft model that the rotor blade 100 is configured to be adapted to, the cutout 130 may be included such that the rotor blade 100 can be used in models as applicable. The cutout 130 may cause a minor decrease in performance of the rotor blade 100; however, the cost savings expected from a common rotor blade 100 used on several aircraft models may outweigh the minor decrease in performance, such that including the cutout 130 is justified.

The spar 110 is exposed in the inboard portion 102 and is disposed between the upper blade skin 112, the lower blade skin, and the leading edge sheath 115 in the outboard portion 106. A root seal 120 is positioned within an inner cavity of the spar 110 and is configured to keep water out of the portion of the rotor blade 100 outboard of the root seal 120. The outboard portion 106 of the rotor blade 100 may be defined as the portion of the rotor blade 100 that is outboard of the root seal 120. The root seal 120 may be positioned more proximate to a first spanwise position defined by the inboard end 118 of the upper blade skin 112 and the lower blade skin than to the blade root 104. The root seal 120 is thus positioned further outboard than in conventional rotor blades. The positioning of the root seal 120 allows a portion of the inboard portion 122 of the spar 110 to be trimmed.

Referring to FIG. 3A, a portion of the spar 110 is shown. The location of the root seal 120 is shown with dashed lines. Section view A-A is shown in FIG. 3B and section view B-B is shown in FIG. 3C. As shown in FIG. 3C, the inboard portion 122 of the spar 110 has a roughly elliptical (e.g., oval) cross section that includes a top layer 132, a bottom layer 134, a leading edge conic 136, and a trailing edge conic 138. The top layer 132 includes an upper surface 133, and the bottom layer 134 includes a lower surface 135. The upper surface 133 and the lower surface 135 are substantially parallel. As shown in FIG. 3B, the upper surface 133 and lower surface of the inboard portion 122 of the spar 110 are spaced apart by a height H, which is substantially constant throughout the inboard portion 122. The thickness T1 of the top layer 132 is substantially constant throughout the inboard portion 122 of the spar 110. The thickness T2 of the bottom layer 134 is also substantially constant throughout the inboard portion 122 of the spar 110. In some embodiments, the thickness T1 may be equal to the thickness T2, while in other embodiments, the thickness T1 may be different than the thickness T2. Because the height H and the thicknesses T1 and T2 do not vary throughout the inboard portion 122 of the spar 110, the spar 110 can be trimmed to various lengths, leaving a substantially flat inboard end to which a cuff can be easily coupled.

The leading edge conic 136 and the trailing edge conic 138 begin where the upper and lower surfaces 133, 135 transition into the curved portion. The width W1 of the upper and lower surfaces 133, 135 may also be substantially constant throughout the inboard portion 122 of the spar 110. The width W2 of the leading edge conic 136 and the width W3 of the trailing edge conic 138 may increase moving inboard, such that the overall chordwise width of the spar 110 is largest (e.g., at a maximum) at the blade root 104 that the overall chordwise width of the spar 110 at locations further outboard. The chordwise width of the inboard portion 122 of the spar 110 may taper from a maximum width at the blade root 104 to a smaller width as the spar 110 extends outwardly from the blade root.

Figure 4B:
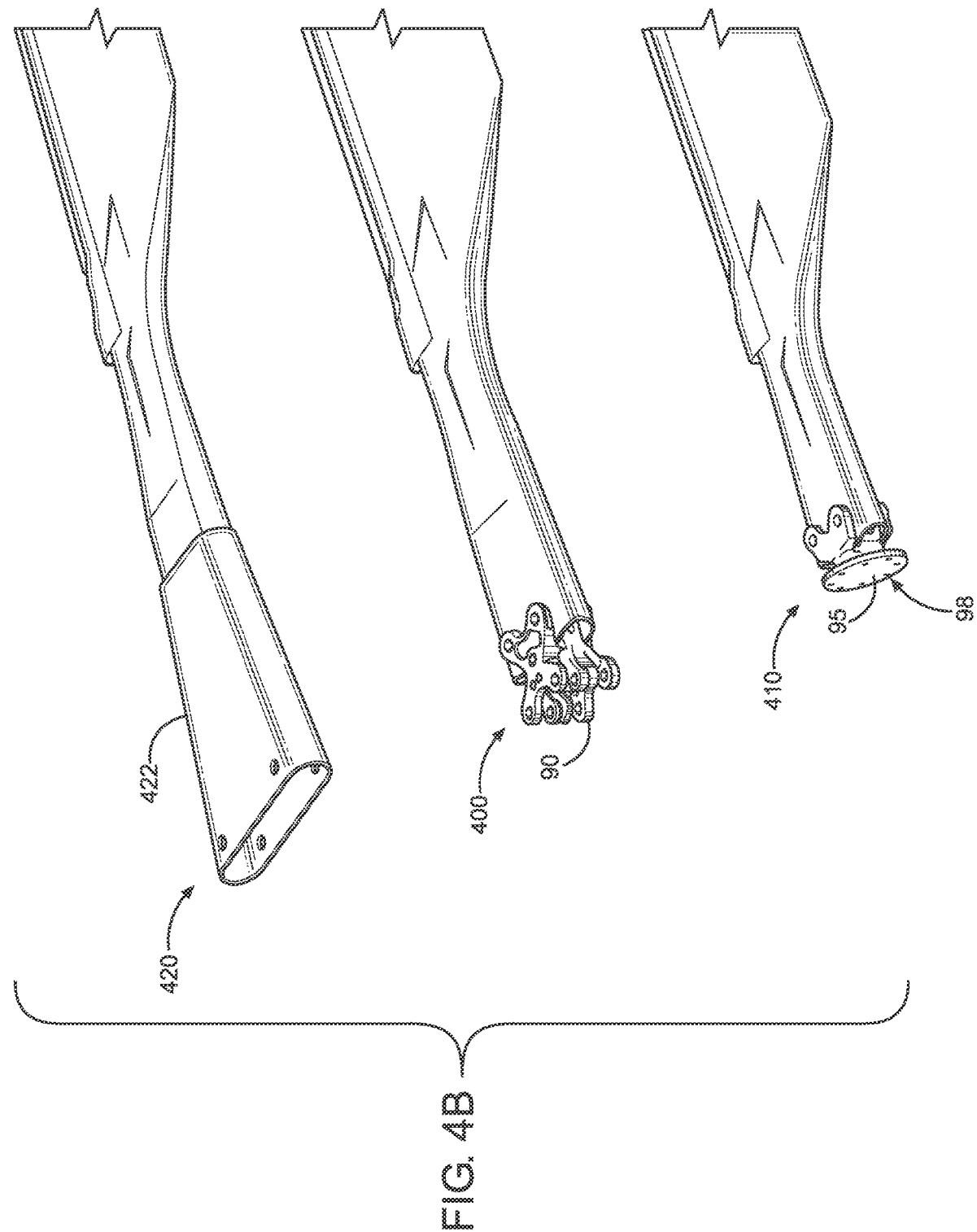
FIG. 4B is a perspective view of the three configurations of FIG. 4A.

FIGS. 4A and 4B illustrate two of multiple ways that the rotor blade 100 may be converted from a first configuration 400 for use on a first aircraft to a second configuration 410 for use on a second aircraft or a third configuration 420 for use on a second aircraft. FIG. 4A shows a plan view of each configuration 400, 410, 420, and FIG. 4B shows a perspective view of each configuration 400, 410, 420. The position of the root seal 120 in each configuration 400, 410, 420 is shown in FIG. 4A.

The rotor blade 100 is shown in a first configuration 400 (e.g., a base configuration) suitable for use in a first model of aircraft. This is the configuration shown in FIG. 2. The base configuration 400 of the rotor blade 100 may include the attachment cuff 90 coupled to the mounting holes 150, 151, which extend through both the top and bottom layers 132, 132 of the spar 110. Pins or fasteners may be inserted into the mounting holes 150, 151 and the corresponding holes 91, 92 in the cuff 90 to couple the cuff 90 to the spar 110. In some embodiments, there may be more or fewer than two mounting holes. In other embodiments, the base configuration may not include a cuff and the cuff 90 may be provided separately. The cuff 90 includes one or more mounting holes 93, 94 configured to receive a pin or fastener that couples the cuff to corresponding holes in the rotor hub to couple the rotor blade 100 to the rotor hub.

The rotor blade 100 may be adaptable for use in a second aircraft that requires a rotor blade with a shorter overall spanwise length. The rotor blade 100 is shown in FIGS. 4A and 4B in a second configuration 410 with a shortened spar 110. Referring to FIG. 5 (and with further reference to FIGS. 4A and 4B), a method 500 of modifying a rotor blade (e.g., rotor blade 100), configured for use in a first aircraft, to be used in a second aircraft is shown, according to an exemplary embodiment. Using the method 500, the rotor blade 100 may be converted from the first configuration 400 to the second configuration 410. At operation 502 of the method 500, a rotor blade is provided. The rotor blade 100 includes a spar having an inboard portion with a substantially constant overall height. The inboard portion further includes a top layer having a substantially constant first thickness and a bottom layer having substantially constant second thickness. In some embodiments, the first thickness may be substantially equal to the second thickness. The rotor blade 100 may include a cutout 130 that may be required when the rotor blade is used on the second aircraft, but may not be required when the rotor blade 100 is used on the first aircraft. For example, the second aircraft may include a rotor hub with a hinge configured to allow the rotor blade 100 to be folded (e.g., rotated, angled etc.) approximately about the rotor shaft axis (e.g., axis of rotation A) such that each rotor blade extends from the rotor hub 80 toward the aft end (e.g., the tail 16) of the second aircraft when the second aircraft is not in flight. In other examples, the rotor blades 100 may be folded forward, or some blades 100 may be folded forward while others are folded rearward. This allows the second aircraft to have a more compact footprint for ground and water transportation, to be parked more closely to other objects or aircraft, and to fit more easily into cargo holds. The cutout 130 may be required such that the rotor blade does not contact other components of the second aircraft when folded. The first aircraft may not include such functionality.

At operation 504 of the method 500, the cuff 90 is removed from the rotor blade 100. For example, the pins may be removed from the mounting holes 150, 151, and the cuff 90 can be slid out from the blade root 104 of the rotor blade 100. The cuff 90 may be reused on another rotor blade or recycled. As discussed above, in some embodiments, the base configuration of the rotor blade 100 does not include a cuff 90. Operation 504 may therefore be omitted and may not be required to complete the method 500 in some embodiments.

At operation 506 of the method 500, the spar 110 is trimmed to a desired length. For example, a root portion of the inboard portion 122 of the spar 110 can be removed to shorten the overall length of the rotor blade 100, so that the rotor blade 100 can be used on an aircraft model that requires a shorter rotor blade. In some embodiments, the spar 110 may be trimmed by a water jet cutter or a CNC machining operation. However, other trimming methods are also contemplated. The root portion of the inboard portion 122 of the spar 110 that is removed in operation 506 may be entirely inboard of the root seal 120 positioned in the inner cavity of the spar 110. At operation 508 of the method 500, new mounting holes 152, 153 (e.g., cuff mounting holes) are formed in the spar 110. In some embodiments, the new mounting holes 152, 153 may be drilled and reamed using a CNC machine. However, other methods of forming the holes are also contemplated. The root seal 120 may be positioned outboard of the location of the new mounting holes 152, 153 in the base configuration 400, so that a new root seal does not need to be installed after the spar 110 is trimmed. In some embodiments, there may be more or fewer than two mounting holes. At operation 510 of the method 500, a new cuff 95 is mounted to the new mounting holes 152, 153, thus converting the first configuration 400 of the rotor blade 100 to the second configuration 410. Pins or fasteners may be inserted into the new mounting holes 152, 153 and corresponding holes 96, 97 in the new cuff 95 to couple the new cuff 95 to the spar 110. The new cuff 95 may then be used to couple the trimmed rotor blade 100 to a rotor hub of the second aircraft. For example, a pin or a fastener may be inserted into each of the one or more holes 96 and corresponding holes in the rotor hub to couple the rotor blade 100 to the rotor hub. In some embodiments, there may be more or fewer than two holes.

Figure 6:
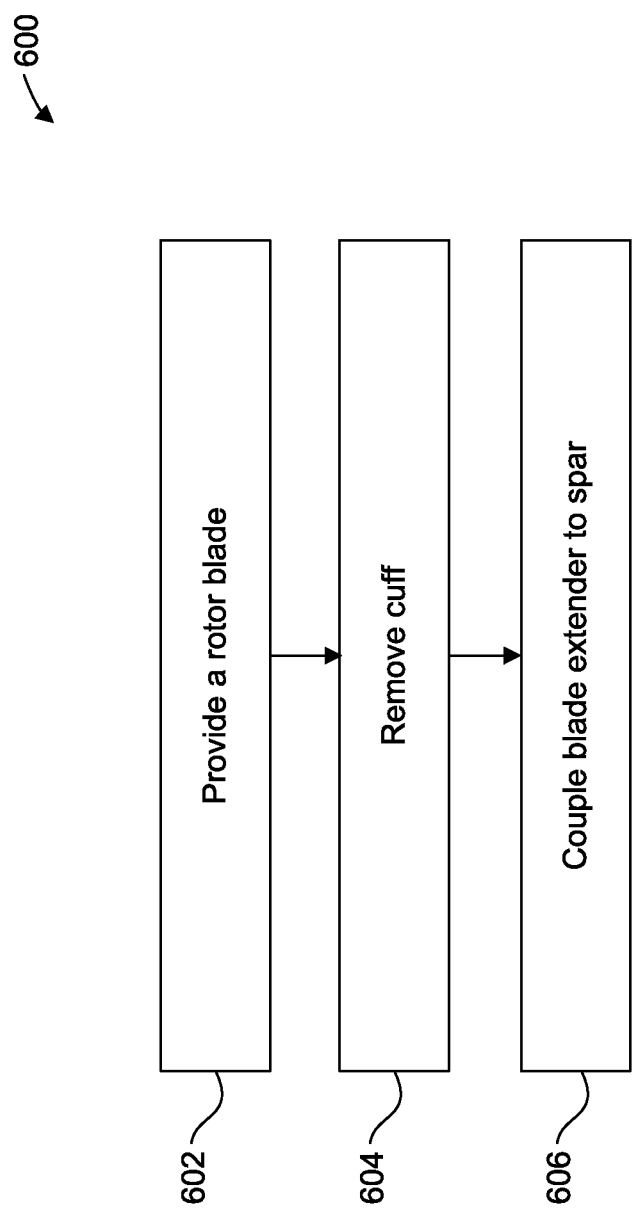
FIG. 6 is a flowchart illustrating a process of modifying a rotor blade, according to some embodiments.

Referring again to FIGS. 4A and 4B, the rotor blade 100 may be adaptable for use in a third aircraft that requires a rotor blade with a longer overall spanwise length. The rotor blade 100 is shown in FIG. 4 in a third configuration 420 with a blade extender 422. Referring to FIG. 6 (and with further reference to FIG. 4), a method 600 of modifying a rotor blade (e.g., rotor blade 100), configured for use in a first aircraft, to be used in a third aircraft is shown, according to an exemplary embodiment. Using the method 500, the rotor blade 100 may be converted from the first configuration 400 to the third configuration 420.

At operation 602 of the method 600, a rotor blade is provided. The rotor blade includes a spar having an inboard portion with a substantially constant overall height. The inboard portion further includes a top layer having a substantially constant first thickness and a bottom layer having substantially constant second thickness. In some embodiments, the first thickness may be substantially equal to the second thickness. At operation 604 of the method 600, the cuff 90 is removed from the rotor blade 100. For example, the pins may be removed from the mounting holes 150, 151, and the cuff 90 can be slid out from the blade root 104 of the rotor blade 100. The cuff 90 may be reused on another rotor blade or recycled. As discussed above, in some embodiments, the base configuration of the rotor blade 100 does not include a cuff 90. Operation 604 may therefore be omitted and may not be required to complete the method 600 in some embodiments.

At operation 606 of the method 600, the blade extender 422 is coupled to the spar 110. The blade extender 422 is configured to couple the rotor blade to a third aircraft. In some embodiments, the blade extender 422 may be coupled to the mounting holes 150, 151 to which the cuff 90 was previously coupled. For example, pins or fasteners may be inserted into the mounting holes 150, 151 through corresponding holes in the blade extender 422 to couple the blade extender 422 to the spar 110. In some embodiments, there may be more or fewer than two mounting holes. In some embodiments, the blade extender 422 may fit around the spar 110 with the outboard end of the blade extender tapering to an opening that is smaller than the blade root 104 of the rotor blade 100. In some embodiments, one or more coupler plates may couple the blade extender 422 to the mounting holes 150, 151. For example, a first end of the coupler plate may be coupled to a mounting hole in the spar 110, and a second end of the coupler plate may be coupled to the blade extender. The blade extender 422 may then be used to couple the extended rotor blade 100 to a hub of the third aircraft. For example, pins or fasteners may be inserted into the mounting holes 424, 425 and corresponding holes in the rotor hub to couple the rotor blade 100 to the rotor hub. In some embodiments, there may be more or fewer than two mounting holes. In some embodiments, the portion of the blade extender 422 that couples to the spar 110 may be referred to as a cuff or a cuff portion.

In each configuration, the portion of blade encompassing the inboardmost portion of the spar 110 that has not been removed may be referred to as the "root end." The location of the root end may vary based on whether and where the inboard portion 122 of the spar 110 is trimmed. Similarly, the location of the blade root 104 may vary based vary based on whether and where the inboard portion 122 of the spar 110 is trimmed.

Configuration of Exemplary Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A rotor blade configured to be installed on a rotary wing aircraft, the rotor blade comprising:
   a spar comprising:
      an inboard portion extending from a root of the rotor blade to a first spanwise position of the rotor blade; and
      an outboard portion meeting the inboard portion at the first spanwise position; and
   an upper skin and a lower skin coupled to the outboard portion of the spar,
   wherein the first spanwise position is defined by a most inboard point at which the upper and lower skins are coupled to the spar,
      wherein the inboard portion comprises a top layer, a bottom layer, and an inner cavity between the top layer and the bottom layer, wherein the top layer has a constant first thickness and the bottom layer has a constant second thickness, and wherein the distance between an outer surface of the top layer and an outer surface of the bottom layer is constant, the outer surface of the top layer and the outer surface of the bottom layer each extending from a leading edge conic to a trailing edge conic.

2. The rotor blade of claim 1, further comprising a root seal positioned in the inner cavity of the inboard portion of the spar, wherein the root seal is positioned closer to the first spanwise position than to the root of the rotor blade.

3. The rotor blade of claim 2, wherein the first thickness is the same as the second thickness.

4. The rotor blade of claim 2, wherein a chordwise width of the spar is at a maximum at the root of the rotor blade.

5. The rotor blade of claim 4, wherein the chordwise width of the inboard portion of the spar tapers from the maximum to a smaller width as the spar extends outwardly from the root of the rotor blade.

6. The rotor blade of claim 5, wherein a first chordwise width of the outer surface of the top layer and a second chordwise width of the outer surface of the bottom layer are constant throughout the inboard portion of the spar.

7. The rotor blade of claim 6, wherein the first chordwise width and the second chordwise width are the same.

8. The rotor blade of claim 6, wherein at least one of a chordwise width of the leading edge conic or a chordwise width of the trailing edge conic vary in the inboard portion of the spar.

9. The rotor blade of claim 1, further comprising a cuff and a mounting hole proximate the root of the rotor blade, the mounting hole configured to receive a pin to couple the rotor blade to the cuff.

10. The rotor blade of claim 1, wherein the outer surface of the top layer and the outer surface of the bottom layer are parallel.

11. The rotor blade of claim 10, wherein the leading edge conic and the trailing edge conic join the top layer and the bottom layer such that the inboard portion of the spar has a substantially oval cross section.

\* \* \* \* \*